United States Patent [19]

Adamski

[11] 3,967,298
[45] June 29, 1976

[54] ELECTRICALLY CONTROLLED PHOTOGRAPHIC CAMERA

[75] Inventor: Günter Adamski, Braunschweig, Germany

[73] Assignee: Rollei-Werke Franke & Heidecke, Braunschweig, Germany

[22] Filed: Feb. 11, 1974

[21] Appl. No.: 441,501

Related U.S. Application Data

[63] Continuation-in-part of Ser. No. 417,411, Nov. 19, 1973, Pat. No. 3,878,546.

[30] Foreign Application Priority Data

Nov. 20, 1972  Germany.......................... 2256795
Oct. 10, 1973  Germany.......................... 2350733
Nov. 6, 1973   Germany.......................... 2355295

[52] U.S. Cl............................. 354/153; 354/152; 354/170; 354/171; 354/173; 354/205; 354/206; 354/213

[51] Int. Cl.²........................ G03B 19/12; G03B 1/18

[58] Field of Search........... 354/170, 171, 173, 152, 354/153, 154, 204, 205, 206, 213, 217, 218

[56] References Cited
UNITED STATES PATENTS

| | | | |
|---|---|---|---|
| 3,221,626 | 12/1965 | Fuketa.............................. | 354/153 |
| 3,613,542 | 10/1971 | Wiessner........................... | 354/171 |
| 3,641,898 | 2/1972 | Kawahara.......................... | 354/173 |
| 3,688,669 | 9/1972 | Ogiso et al........................ | 354/171 |
| 3,783,762 | 1/1974 | Sugimori........................... | 354/173 |
| 3,842,587 | 10/1974 | Strauss et al..................... | 354/23 D |

FOREIGN PATENTS OR APPLICATIONS

878,191   9/1942   France.............................. 354/173

*Primary Examiner*—L. T. Hix
*Assistant Examiner*—Russell E. Adams, Jr.
*Attorney, Agent, or Firm*—Stonebraker, Shepard & Stephens

[57] ABSTRACT

A single lens mirror reflex camera arranged for very fast operation. Both the reflex mirror and the auxiliary shutter or protecting flap are moved very quickly from viewing position to picture-taking position, without jar or vibration, by means of separate operating linkages which are in an angular position while the mirror and flap are in viewing position, and which straighten out to straight-line or dead-center positions as the mirror and flap move to picture-taking position, thus bringing them to a smooth stop. A step-by-step electrical switch controls various functions of the camera at various step positions of the switch. One step initiates the running of an electric motor which serves both to wind the film in the camera and to restore the mirror and auxiliary shutter from picture-taking position to viewing position.

17 Claims, 9 Drawing Figures

ELECTRICALLY CONTROLLED PHOTOGRAPHIC CAMERA

CROSS REFERENCE TO RELATED APPLICATION

This application is a continuation-in-part of my application Ser. No. 417,411, filed Nov. 19, 1973, for Roll film camera with electrical film feeding, now U.S. Pat. No. 3,878,546, granted Apr. 15, 1975.

BACKGROUND OF THE INVENTION

This invention relates to a still camera in which the various functions are performed or controlled electrically. The camera is preferably of the single lens mirror reflex type, in which the scene to be photographed is viewed through the picture taking lens, by the aid of a reflex mirror, which is normally in viewing position, but which is swung upwardly out of the way of the beam of light when viewing is completed and when the actual exposure is to be made.

A number of separate but closely related functions must be performed during a complete cycle of operation of a camera of this general type. The present application deals particularly with the mechanisms for performing the functions of film winding and of movement of the reflex mirror from viewing position to picture taking position and back to viewing position.

The construction disclosed in the present application is closely related to and in part an improvement upon the construction disclosed in the copending patent application of Karl-Peter Strauss and Wilhelm Koller, Ser. No. 386,379, filed Aug. 7, 1973, for Photographic camera control means, owned by the owner of the present application, now abandoned. The construction herein disclosed is also closely related to and an improvement upon the construction disclosed in the present applicant's above mentioned application, Ser. No. 417,411.

SUMMARY OF THE INVENTION

The camera in its preferred form is a single lens mirror reflex camera, the various operative functions of which, so far as the present invention is concerned, are controlled by a step by step electrical switch, moved from one step to another by pulses produced by a pulse generator. The camera is of the general form disclosed in the above mentioned Strauss and Koller application Ser. No. 386,379. At an appropriate time in the cycle, a film feeding motor is switched on, and runs to a sufficient extent to feed the film from one picture frame to the next frame, provided there is film in the camera. A safety switch controlled by a feeler engaging with the film opens the circuit to prevent operation of the motor if no film is present. The film feeding motor also drives the mechanism for restoring the mirror and the associated film protecting flap from picture taking position to normal or viewing position, at the same time tensioning the springs which will rapidly move the mirror and protecting flap from viewing position to picture taking position at the proper time, when the shutter release or trigger is tripped to initiate the actual exposure of the film.

The mechanism for moving the mirror and flap from normal viewing position to picture taking position is a particularly noteworthy feature of the present invention. In other cameras of this general type, both noise and vibration are produced to a very undesirable extent if it is attempted to move the mirror rapidly, in order to enable the picture to be taken quickly after the viewing is finished. In the present construction, even though the movement of the mirror is very rapid, it is practically noiseless and vibrationless. This desirable result is accomplished in part by the use of a pivoted linkage which is bent at an angle when the mirror is in viewing position, and which is straightened to a deadcenter or straight-line position when the mirror reaches picture-taking position. Thus the linkage itself, as it approaches the limit or straight-line position (with its various articulation points in a straight line) automatically slows down the movement of the mirror as it approaches its limit position, bringing it to a smooth and vibrationless stop, without appreciable noise. Another linkage likewise operating on the straight-line or dead-center position does the same for the film protecting flap. Thus no separate damping means is needed, even though the movements of the mirror and the flap are very rapid.

Another important feature of the present invention is the provision of electrical control circuits so arranged that certain functions can be performed simultaneously rather than successively, thus shortening the time required for the complete cycle of operation of the camera. Instead of performing all functions successively, with one function not started until the preceding function has been completed, as is done in some prior cameras, the present construction has the electrical circuitry so designed that the film feeding and mirror restoring motor can continue to run after the step-by-step switch is advanced to the next step, where for example the shutter is opened for viewing, and the motor is turned off after the proper amount of film has been fed, this being controlled, for example, by wiper arms in the electrical circuit, which serve to complete the circuit while they are in contact with a conducting portion on a member movable with the advance of the film, and the circuit is broken to stop the motor when the conducting portion moves out from under the wiper arms and an insulating portion moves under the wiping arms.

DESCRIPTION OF THE PREFERRED EMBODIMENT

Figure 1A:
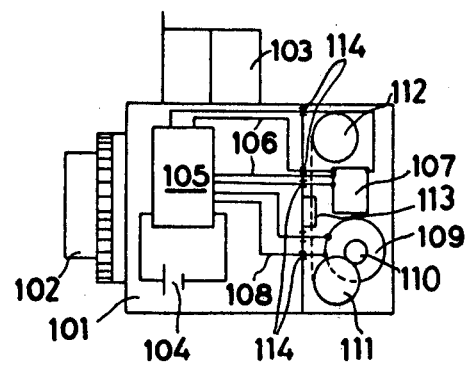
FIG. 1a is a schematic side elevational view of a camera in accordance with one embodiment of the invention.

Referring first to FIG. 1a, there is shown schematically a still camera of the single lens mirror reflex type, having a housing 101, a lens 102, and a viewfinder hood 103. A source of voltage 104, such as a battery, feeds an electronic control device 105, which is connected by circuit conductors 106 with the film advancing mechanisms here indicated schematically by the rectangle 107. It is also connected by circuit conductors 108 to the motor 109 which, through gearing 110, drives the film take up spool 111. This same motor 109 also drives the viewing mirror from picture taking position back to its normal or viewing position, as will be further explained later in connection with FIGS. 6 and 7.

Figure 1B:
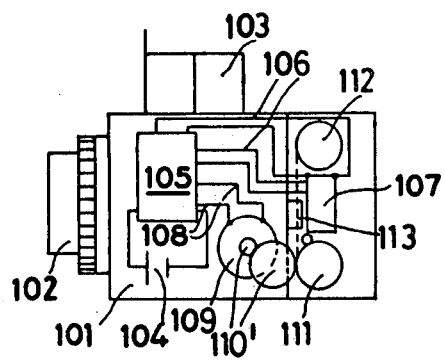
FIG. 1b is a similar view illustrating a slightly modified form of the camera.

Upon rotation of the film take-up spool 111, the film is withdrawn from the supply spool 112, is drawn through the film gate of exposure window 113, and is wound up on the spool 111. The rear wall or back portion of the camera body is hinged to swing to an open position to permit change of the film. If the motor 109 is carried by the swinging back cover of the camera and is constantly coupled with the take-up spool 111, then the circuit conductors 108 leading to the motor (as well as any other circuit conductors leading to other parts mounted on the camera back) have to be separable at 114 to permit the camera back to be opened, the connections being automatically made again when the back is closed. In the alternative form illustrated in FIG. 1b, the motor 109 is mounted on the camera body or housing, along with the intermediate gearing 110', which meshes with a gear on the take-up spool 111 when the camera back is closed, and separates readily when the camera back is opened, so that no separable connections in the circuit going to the motor are needed. However, separable connections are still needed for other circuits going to other electrical elements mounted on the camera back.

Figure 2:
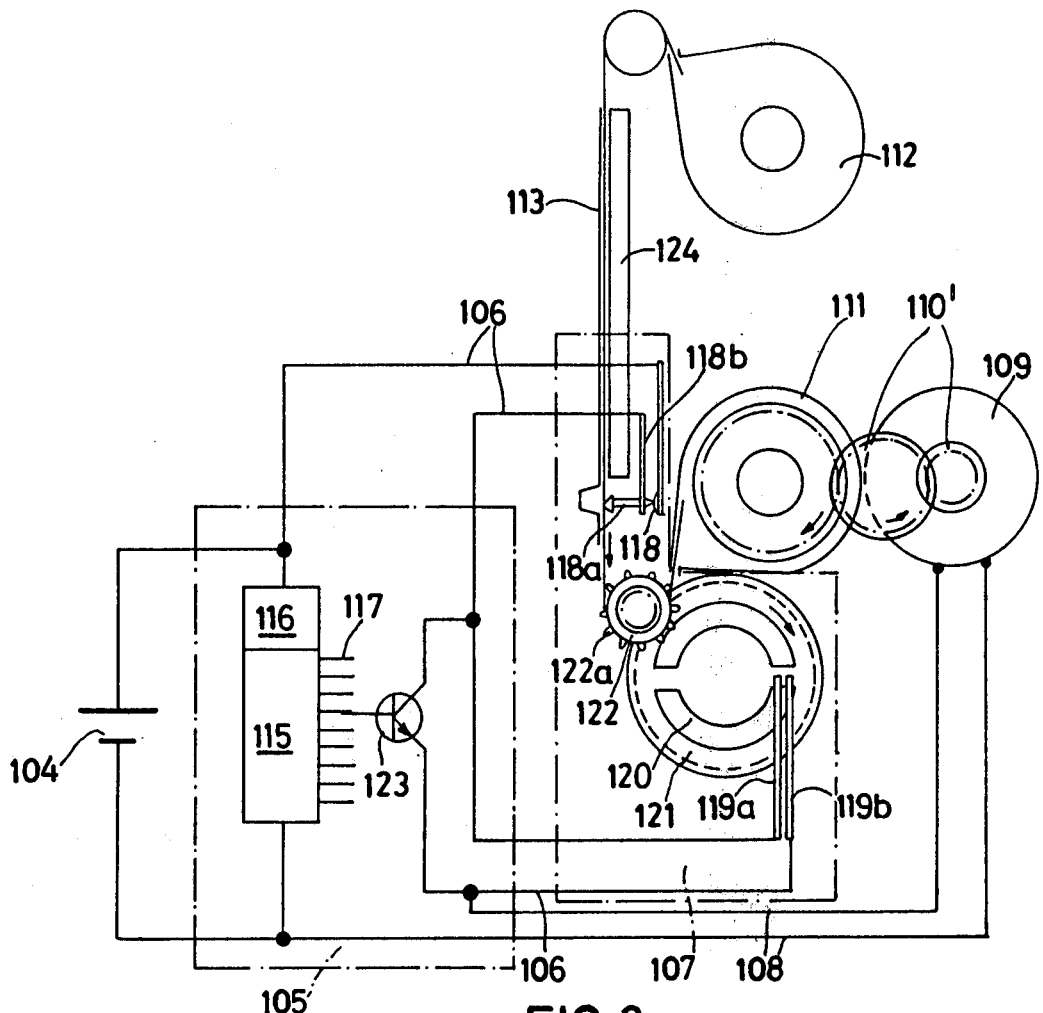
FIG. 2 is a schematic illustration on a larger scale, showing particularly the details of the film advancing mechanism and certain electrical circuits relating thereto, including the switch arrangement for stopping the motor when the proper length of film has been fed.

FIG. 2 shows the construction schematically on a larger scale and in greater detail. The electronic control device 105 of FIGS. 1a and 1n is here shown in FIG. 2 as a step-by-step switch 115 actuated by a pulse generator 116 in such a way that with each pulse, the step-by-step switch 115 in fixed sequence provides one of its output connections 117 with a signal. The individual camera parts to be placed in operation when a photograph is taken, are connected with the various outputs 117 and are placed in operation when a signal appears at the corresponding output and held in operation until the pulse generator 116 places the step-by-step switch at the next step. This is described in the above mentioned patent application Ser. No. 386,379. The film transport motor 109 of the present application is actuated when a signal is given at that one of the output connections 117 which is known as step 9 of the step-by-step switch.

The switch 115 and the control pulse generator 116 are provided with current from the source 104. The conductor 106 leading from the control device 105 to the film switching mechanism indicated in general at 107 is connected in the control device with the positive terminal of the battery or other source of voltage 104, and with the conductor 108 leading from the control device to the motor 109. The conductor 106 is interrupted within the film switching mechanism by film sensor contact 118 and a wiper contact arrangement comprising two wiper arms 119a and 119b and which rest on a conductive segment 120 arranged concentrically on a disk 121 which rotatable by means of a metering gear 122 having teeth 122a which engage in sprocket holes in one edge of the film. The conductive segment 120 is not continuous but is interrupted by insulating gaps, as illustrated. When the two wiper arms 119a, and 119b rest on the conductive segment 120, the circuit is completed at this point. When the disk 121 turns to a position where the wiper arms rest on an insulating gap in the conductive segment, then the circuit is open or interrupted at this point.

Returning to the sensor contact 118, this comprises two arms, one of which 118b is resilient and tends to spring away from the companion arm, to open the circuit at this point. However, a pin or lever 118a rests against the film strip and keeps the resilient arm 118b against the other arm of this sensor switch, so long as film is present at this point, When there is no film (e.g. when the trailing end of the film is drawn past this point) the resilience of the sensor arm 118b moves it away from the other arm of this switch, opening the circuit at this point.

The wiper contact 119a, 119b can be bridged over by the electronic control device 105. For example, a transistor 123 has its emitter-collector path connected in parallel with the switch 119a, 119b, and the base of the transistor is connected to the appropriate output 17 of the step-by-step switch 115. When this switch 115 reaches the appropriate step, a pulse is delivered to the base of the transistor, making the transistor conductive so that the circuit to the motor 109 is completed notwithstanding that the switch 119a, 119b is open. Assuming that there is film in the location of the sensor switch 118, so that this switch is closed, the motor now begins to run, and begins to advance the film, the movement of which turns the disk 121 so that a conductive segment 120 now comes under the wiper arms 119a and 119b and closes the circuit at this point, so that the motor 109 will continue to run even though the transistor 123 becomes non-conductive after a brief interval of conductivity. The motor continues to run and to advance the film until the next insulated portion of the disk 121 comes around to the wiper arms, and this opens the circuit so that the motor stops. The length of the conductive segments 120 and the location of the intervening insulating portions are so designed that the motor runs just long enough to advance the film through the proper amount from one picture frame or exposure area to the next. During its travel through the picture window of film gate 113, the film is guided and held by the pressure plate 124.

It is believed that the operation wil be clear from what has been said above, but it may be briefly summarized at this point. The step-by-step switch 115 operates through its successive steps in the manner explained in the above mentioned patent application Ser. No. 386,379, and when step 9 is reached, a pulse is conducted to the base of the heat transistor 123, to render this transistor conductive. It should be added, however, that the details of the way in which the switch 115 operates are not important for purposes of the present invention. So far as the present invention is concerned, one may simply consider that at the appropriate time for winding the film and moving the reflex mirror, a pulse is delivered to the base of the transistor 123 in any suitable or conventional way, to render the transistor conductive.

When the transistor is rendered conductive, this completes the circuit to the motor 109, assuming that the film is present at the location of the sensor switch 118 so that this switch is closed. As soon as the motor 109 begins to run, it turns the take-up spool 111 and draws the film, which turns the metering gear 122, thereby resulting the disk 121 and immediately moving the insulated portion out from under the wiper arms 119a and 119b, and moving a conducting segment portion 120 under those arms, to close the circuit at this point. Conductivity of the transistor 123 is no longer needed. After only 10 milliseconds, the step-by-step switch 115 moves on from step 9, to step 10, and thereby the transistor 124 becoms blocked or non-conductive but the circuit remains closed through the conducting level 120.

Simultaneously with advancing the film, the reflex mirror is moved from picture-taking position to viewing position, and also the auxiliary shutter or protecting flap is moved to film-protecting position, as will be fully explained below. The motor continues to run until the next insulated portion on the disk 121 comes under the wiper arms, and this opens the circuit and stops the motor. The parts are so designed that the film is advanced through precisely the correct amount of the length of one picture area plus any desired blank margin between picture areas. Meanwhile, as above mentioned, the step-by-step switch 115 has moved on from step 9 to step 10, in which the shutter opening device of the camera is operated, and the diaphragm is also opened to maximum aperture either at step 10 or at step 11 (depending upon the exact design of this circuit, which is not important for purposes of the present invention) so that the camera is again ready to take a picture.

Figure 3:
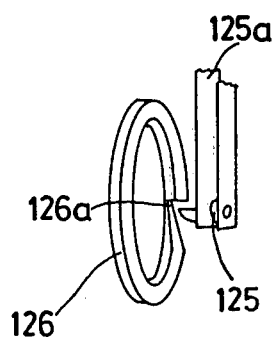
FIG. 3 is a schematic fragmentary perspective view of a modified form of switch.

A modified form of switch is shown in FIG. 3. Instead of the spring contact wiper arms 119a and 119b, they are here replaced (in FIG. 3) by spring contact arms 125 and 125a which tend to spring away from each other but are held in contact with each other by a cam ring 126 mounted concentrically on the disk 121. This cam ring has a series of notches 126a (only one being shown) at appropriate intervals around the periphery.

When the disk 121 turns (just as described in connection with FIG. 2) the cam ring 126 carried by the disk turns with it. When the notch 126a reaches the feeler projection on the resilient contact 125a, the feeler drops into the notch and the switch opens, just as was the case in FIG. 2 when an insulating portion came under the ends of the arms 119a, 119b. As before, conductivity of the transistor closes the circuit and starts the motor, and rotation of the cam ring 126 causes the feeler to ride up the slope of the notch to close the switch 125, 125a, so that the transistor can then become non-conductive but the motor will continue to run. The notches 126a are, of course, placed at appropriate intervals corresponding to feeding the desired amount of film through the proper length from one exposure area to the next.

Figure 4:
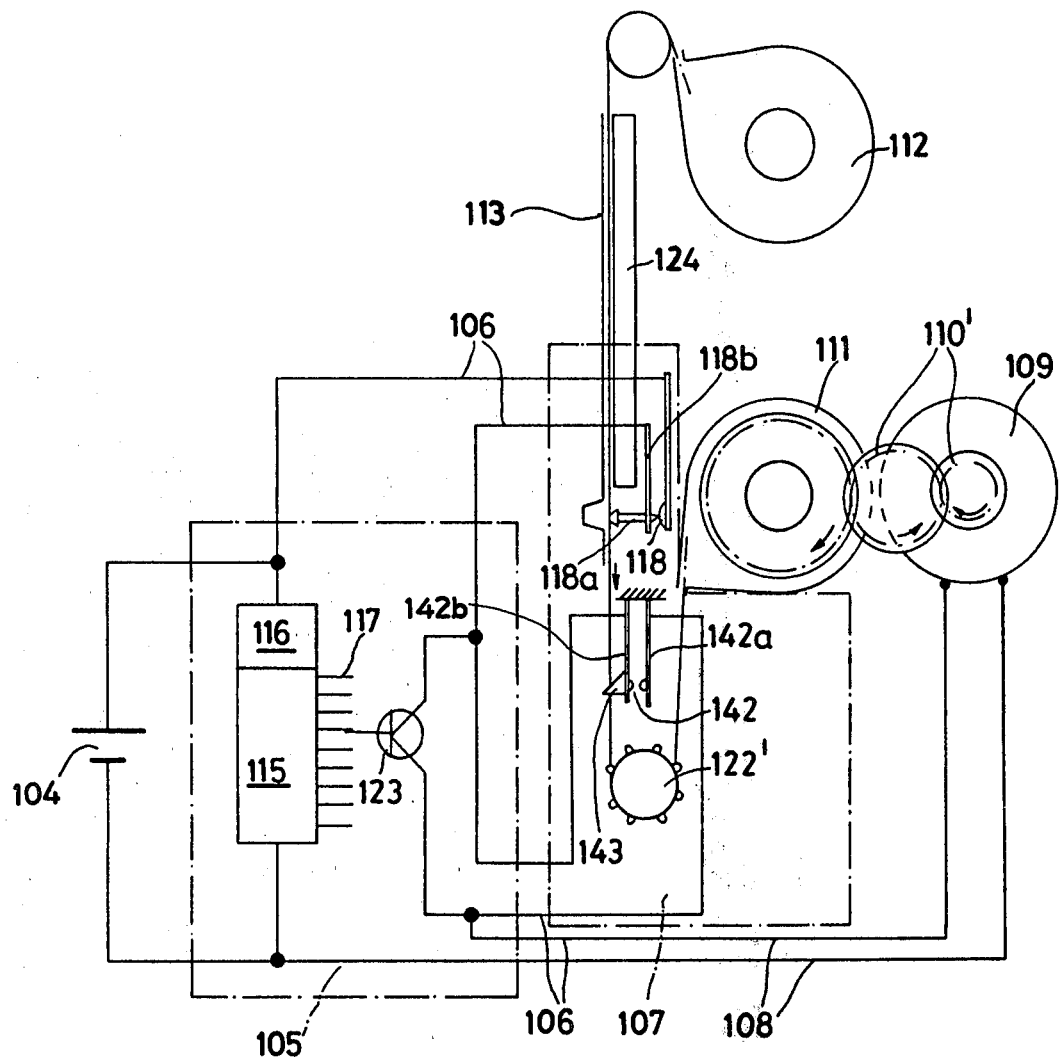
FIG. 4 is a view similar to FIG. 2, illustrating another switching arrangement for stopping the motor when the proper length of film has been fed.

In FIG. 4, another variation is illustrated. Instead of using a disk 121 with a conducting segment 120 thereon, the disk is eliminated. A make and break contact switch 142 is interposed in the circuit, and just as in the case of the parts 125 and 125a in FIG. 3, the arms 142a and 142b of this switch tend resiliently to separate. A feeler 143, constituted by a projection on the switch arm 142b, rides on one edge of the film, this edge being perforated at intervals corresponding to the length of the picture area plus whatever margin between areas is desired. When a perforation comes to the feeler 143 during the advancing movement of the film, the feeler drops into the perforation and the switch 142 opens, stopping the motor. During the next cycle, when the motor is started again by rendering the transistor 123 conductive, the feeler projection 143 is cammed out of the perforation in the film and rides on the unperforated portion of the film, closing the switch 142 and keeping it closed until the next perforation reaches the feeler 143, which occurs after the desired extent of feeding of the film. The rest of the operation is the same as previously described.

Figure 5:
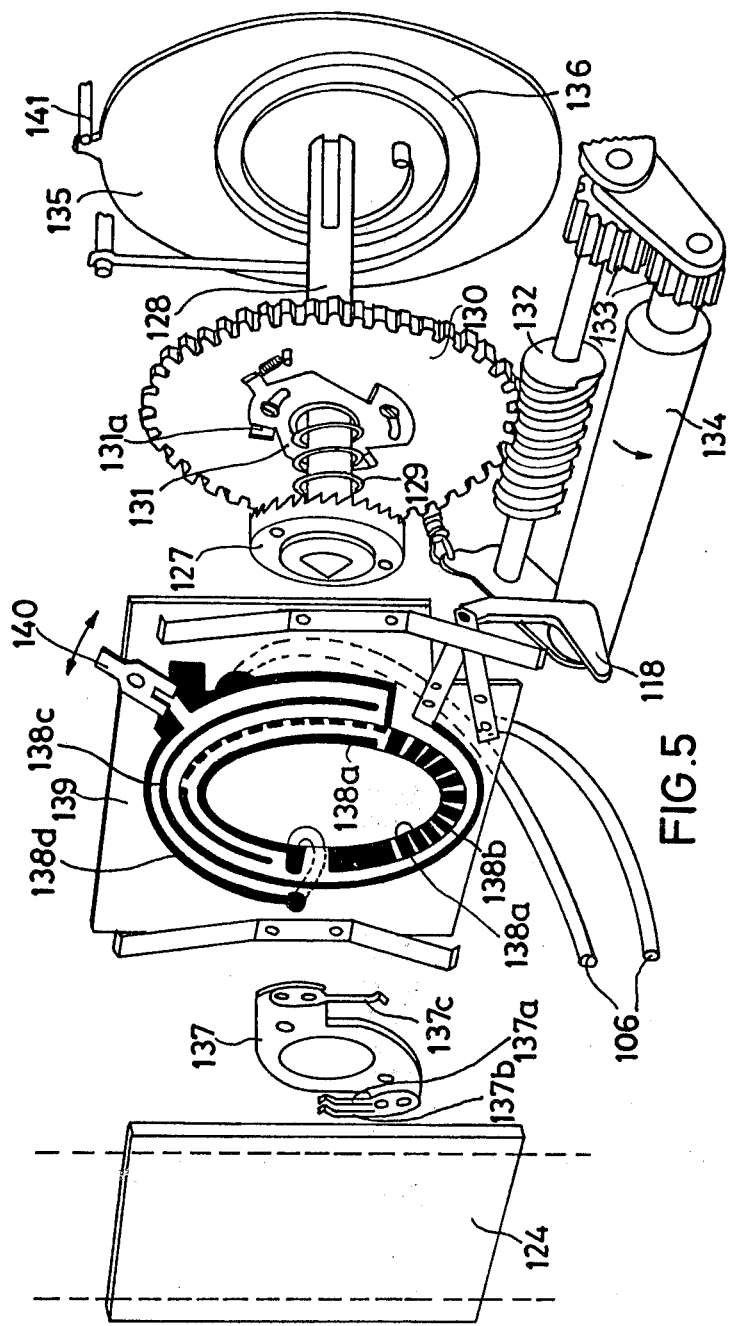
FIG. 5 is an exploded perspective view of still another form of switching mechanism for the film feeding motor, shown in connection with a picture counter.

In FIG. 5 there is shown another variant of the film switching mechanism for controlling the length of film which is fed at each operation, and this variant form is associated with a picture counter which will inform the photographer of the number of the exposure.

In this construction, there is a toothed disk 127 rigidly mounted at the forward end of a short shaft 128 which is rotatable and axially movable in the pivoted back of the camera and which extends in a direction perpendicular to the plane of the film and its pressure plate 124. A spring 129 surrounds the shaft 128 between the toothed disk 127 and a gear 130 which is loosely mounted on the shaft 128 and which has, on its forward face, a driver 131 having forward projections 131a adapted to engage with the rearwardly directed teeth of the disk 127, when the driver and the disk are brought against each other.

By any suitable means (not shown) the gear 130 is held against axial movement, in a fixed axial position where the teeth on the periphery of the gear mesh with a worm wheel 132 driven through gears 133 from a roller 134 which bears against the film and is driven by the advancing movement of the film.

A counter disk 135 is mounted on the shaft 128 rearwardly of the gear 130, and is coupled to the shaft to rotate therewith. A spiral spring 136 having one end fixed to the disk 135 tends to turn the disk clockwise when viewed as in FIG. 5, to a limit position determined by a fixed stop 141. The other end of the spring 136 is fixed to a stationary pin.

A contact spring holder 137 is fixed to the front face of the toothed disk 127 to rotate therewith. This holder 137 carries three resilient contact springs 137a, 137b, and 137c, all conductively connected to each other through the holder 137. The free ends of these three springs lie on conductive paths 138 which are arranged concentrically to the shaft 128 on a fixed plate 139. The contact spring 137a lies on the conductive path 138a; the contact spring 137b lies on the conductive path 138b; and the contact spring 137c on the conductive path 138c. The conductive paths 138a and 138b are divided up by radially extending insulating interruptions into a number of pieces corresponding to the number of pictures on the film strip, a longer uninterrupted contact path being provided in front of the first picture position, for winding up of the inserted film on the film take-up spool, and another long conductive path being provided after the last picture, for the full winding of the trailing end of the film onto the take-up spool. The camera is preferably equipped to handle films of either 12 or 24 exposures. Hence the conductive path 138a is divided into 12 conductive sections insulated from each other, and the path 138b is divided into 24 conductive sections insulated from each other. Along side the second half of the 12 sections of the path 138b divided into 24 sections, there is a closed section of the conductive path 138a whose end is connected through a switch 140 with a tap on the 12th section of the conductive path 138a, and with the circuit conductor 106. By manually changing this switch 140 from one position to the other, the counter can be set for either 12 pictures or 24 pictures.

The manner of operation is as follows:

When the step-by-step switch 115 (FIG. 2) reaches the previously mentioned step 9, a pulse is transmitted to the transistor 123 to make it conductive, and this completes the electric circuit to the electric motor 109, through the closed film sensing contact 118 and the conductors 108, so that the motor turns the film take-up spool 111. The movement of the film turns the roller 134, thereby rotating the worm 132 which slowly turns the gear 130, and with it, the driver 131 which at this time is engaged with the teeth of the disk 127 so that the disk is correspondingly turned, carrying with it the holder 137 and the electric contact wipers 137a, 137b, and 137c. By this slight rotation of the contact spring holder 137, the wipers 137a and 137b are turned out of an interruption or insulated portion and onto the conductive sections of the conductive paths 138a and 138b.

If the switch 140 is set for 24 pictures rather than 12 pictures, the switch is in the open or non-conducting position, and the current path 138d is interrupted. The current to the motor is then conducted through the conductor 106, the film sensing contact 118, the conductive path 138c of the contact spring 137c, the contact spring holder 137, the contact springs 137a and 137b, via the contact path 138b of the line 106, to the film transport motor. While the step-by-step switch 115 is now placed by the control pulse generator 116 onto the next step, the motor 109 is held for this time in connected or running condition until the contact springs 137a and 137b pass into the next interruption or insulating portion of their respective paths as a result of the turning of the contact wiper springs by the movement of the film. This takes place, corresponding to the interruptions selected in the present case, for 24 lengths of picture areas, since the conductive path sections have been selected sufficiently large so that the advance of the film by the length of one picture causes a turning of the contact springs 137a and 137b from one insulating interruption to the next one. The counting disk 135 turns with the toothed disk 127, and indicated the picture number moved forward, by means of numerals (not shown) on the rear face of the disk 135, visible through a suitable window (also not shown) in the rear wall of the camera back. Such numerals and window are illustrated in the above mentioned patent application Ser. No. 417,411.

After the 24th picture is taken, the contact or wiper spring 137b comes onto a longer section of its conductive path, and thus keeps the motor in operation until the entire trailing end of the film has been wound onto the take-up spool.

If the camera is loaded with a film having only 12 exposures rather than 24, then the switch 140 is manually shifted to its closed position, so that the current feed path 138d is continuous and not interrupted. In this case, the conducting of the current to the motor takes place over the conductor 106, the closed film sensing contact 118, the conductive path 138c, the contact spring or wiper 137c, the contact spring holder 137, the contact wipers 137a and 137b, the conductive paths 138a and 138b, and the conductor 106. The manner of operation in this case, up to and including picture no. 12, is the same as described above. After the taking of picture 12, the contact spring wiper 137a comes on to the continuous portion of the conductive path 138a, and now causes the motor 109 to continue running until the wiper 137a has arrived at the end of the conductive path 138a and opens the motor circuit here. In this way, after 12 pictures have been taken, the film is completely wound onto the take-up spool 111.

Upon opening the rear wall of the camera, the spring 131 moves the toothed disk 127 and its shaft 128 slightly forwardly, out of engagement with the driver 131, so that now the spring 136 turns the number disk 135 back to its starting position determined by the stop 141. The shaft 128 turns with the disk 135, thus restoring the wiper carrier 137 and the wiper springs back to their starting positions. Then when the camera back is closed after inserting a new film in the camera, the closing motion forces the shaft 128 and disk 127 slightly rearwardly against the action of the spring 129, bringing the teeth on the disk 127 into engagement with the forward projection on the driver 131, so that the parts are ready to start with the first exposure on the new film.

Figure 6:
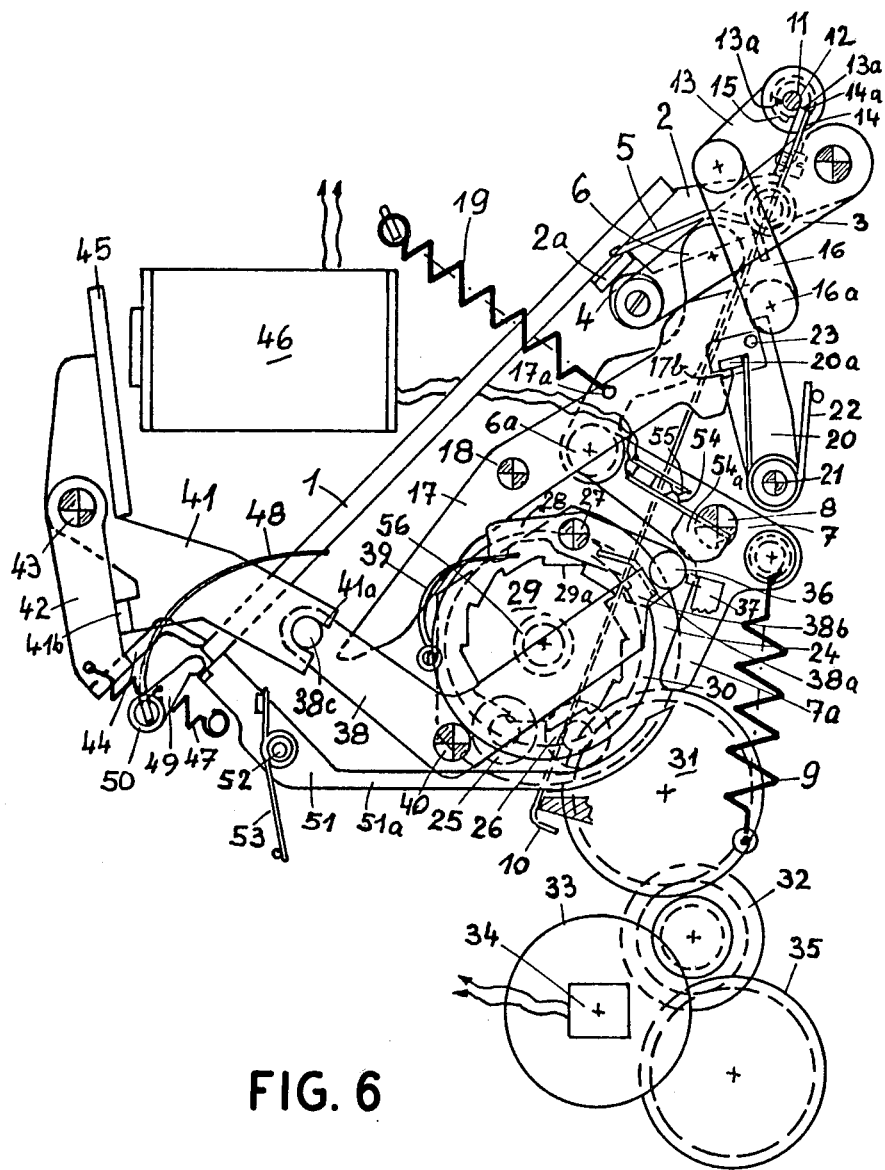
FIG. 6 is a fragmentary side elevational view of the mirror mechanism, with the mirror and the protecting flap or auxiliary shutter in viewing position.
Figure 7:
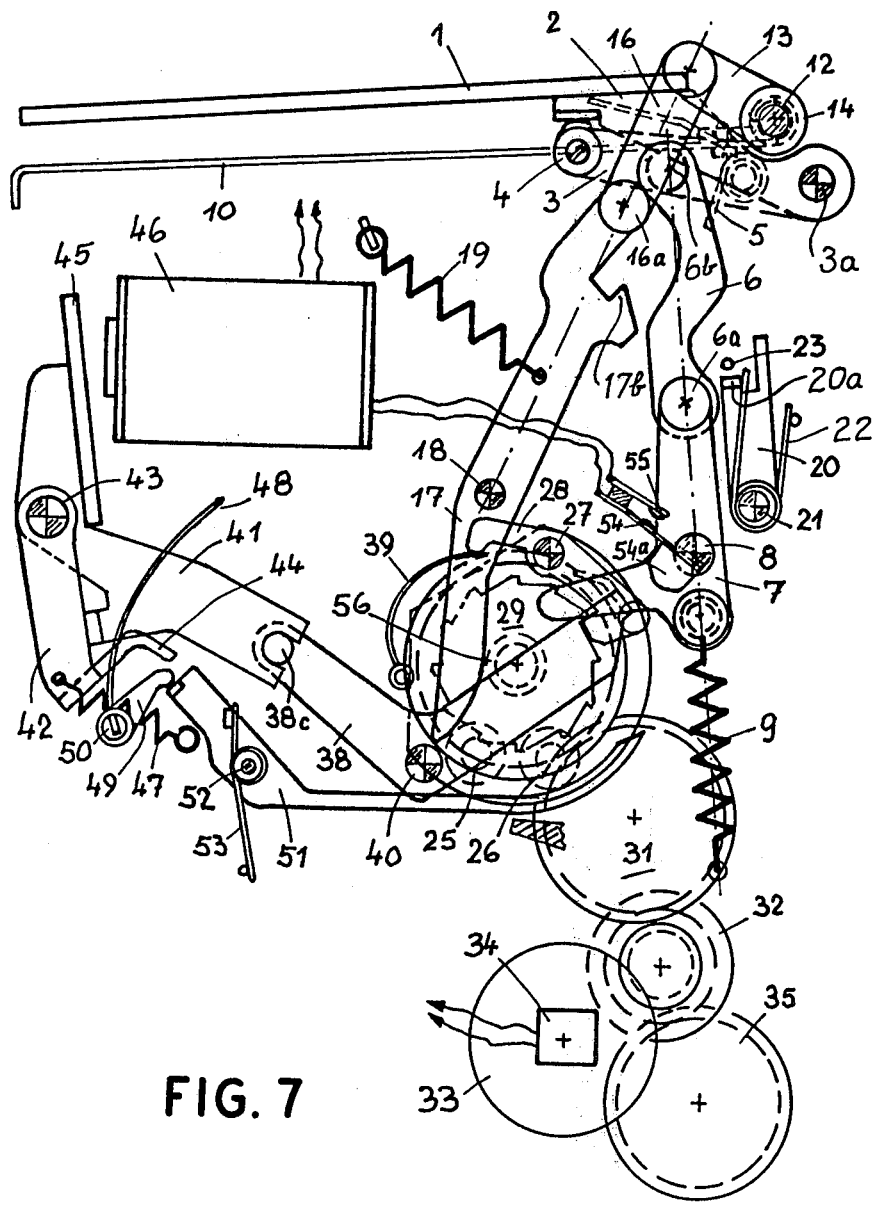
FIG. 7 is a similar view with the parts in picture taking position.

As above mentioned, the opertion of the film transport motor 109 serves also to restore the reflex mirror from picture taking position to viewing position, which is its normal rest position, and serves at the same time to cock or tension the driving springs which move the mirror rapidly from viewing position to picture taking position just before the actual exposure is made. The motor also does the same for the film protecting flap (sometimes called an auxiliary shutter) when such a flap is used, as for example when the camera is equipped with an objective shutter or lens shutter. When the camera has a focal plane shutter or curtain shutter, the protecting flap can be and usually is omitted. The mirror mechanism and associated protective flap mechanism will now be described with reference to FIGS. 6 and 7. FIG. 6 shows the parts in viewing position or normal rest position, while FIG. 7 shows the parts in picture taking position.

The swingable mirror is indicated at 1, and is firmly connected with a carrying member 2 which is pivotally connected with a single-armed carrier lever 3 at the swivel point or pivotal point of the latter. The carrier lever 3 has a fine adjustment projection 4, conveniently in the form of an adjustable eccentric, against which an extension 2a of the carrying member is pressed under the influence of a spring 5.

The carrying lever 3 is articulated via a connecting rod 6 with a triple-armed lever 7. The lever 7 is swingable about a fixed point 8 and bears the aforementioned pivot connection 6a with the connecting rod 6 at the end of one of its lever arms, while a drive spring 9 developed as a tension spring acts on the free end of another lever arm in a straight line with the first arm. Mirror 1, carrying member 2, carrier lever 3, connecting rod 6, lever 7, and spring 9 are so arranged that in the picture-taking position of the mirror shown in FIG. 7, the direction of tension of the spring lies on a straight line passing through the lever point 8 and the two pivot points 6a and 6b of the connecting rod 6. The mirror-displacement lever 7 has a third arm 7a extending approximately perpendicularly from the main length of the lever and which, as shown in FIG. 7, extends in the picture-taking position of the mirror into the range of displacement of a return member which will be described in further detail below.

The auxiliary shutter consists of a cover plate 10 which is provided at its end with an eye 11 which is rotatable around a pin 12. There is also swingable about the pin 12 a driver 13 which has two radially extending surfaces 13a and 13b. The surface 13a of the driver rests under spring pressure against the edge 14a of a projection 14 riveted to the end of the lever. This spring pressure is applied by a spiral spring 15 placed around the pin, one arm of which rests against the cover plate 10, while its other arm rests against the drive surface 13b. The driver 13 is pivoted via a connecting rod 16 to a doublearmed lever 17 which is swingable about a pivot 18 and on which another drive spring 19 also developed as tension spring acts at the point 17a.

While one arm of the double-armed lever 17 bears the pivot connection 16a for the connecting rod 16, the other arm, as shown in FIG. 7, extends in the picture-taking position of the cover flap into the range of displacement of the return member which will be described below. Near its upper end, the lever 17 has a projection 17b which in the viewing position of the cover flap, shown in FIG. 6, is held fast to a projection 20a of a step member 20 which is swingable around a fixed point 21 and pressed against a fixed stop 23 under the action of a spring 22.

The aforementioned return member consists of a cam disk 24 which has two cam portions 25 and 26, preferably in the form of rollers, and a pawl 28 which is swingable around a fixed pivot 27 on the disk. The pawl 28 has a nose which cooperates with teeth 29a on a gear 29 which is rigidly connected to a gear 30 which is driven via an intermediate gear 31 and another intermediate gear 32 from the drive gear 33 of an electric motor schematically shown at 34, which is the same film transport motor shown at 109 in FIGS. 1–4. The intermediate gear 32 at the same time drives a take-up gear 35 for the film transport, corresponding to the gear 110 or 110' in FIGS. 1–4. The pawl 28 bears a pin 36 which, as shown in FIG. 6, in the viewing position of the cover plate, rests on the one hand against a fixed stop 37 and on the other hand against a projection 38b of an angled lever 38, which projection is provided with a run-on incline 38a. In this position, the pawl is out of engagement with the teeth 29a of the gear 29. A spring 39 mounted on the disk 24 tends to raise the tail of the pawl and depress the nost thereof into engagement with the teeth 29a, but is prevented from doing so as long as the pin 36 of the pawl is resting on the end of the lever 38.

The pin 36 via an insulating piece 54a actuates the contact arm 54 of a contact 55 located in the energizing circuit of an electromagnet 46, in such a manner that when the pawl 28 is engaged with the gear 29, the contact 54 is opened, and when the pawl 28 is disengaged, the contact is closed.

The crank lever 38 which turns on a fixed pivot 40 has a pin 38c received in a fork guide 41a of an armature lever 41 which is swingably supported at a fixed point 43. The armature lever bears on the other arm an armature 45 which is attracted by the electromagnet 46. Around the fixed pivot 43 there is also swingable a single-armed locking lever 42 which carries an angle member 44 against which, in viewing position, the mirror 1 rests under the force of the drive spring 9. The locking lever 42 is pulled by a spring 47 against a stop 41b seated on the armature lever 41, and in this way, when the magnet 46 is without current, it is held in a position which locks the mirror 1.

As additional drive for the mirror 1 there is provided a correspondingly shaped wire spring or leaf spring 48 which, in the position of rest of the mirror, rests under tension against the bottom of the mirror. The wire spring 48 is firmly connected with a cocking pawl 49 which is swingable about a point 50. The cocking pawl 49 is swingable by a skid lever 51 the lever arm 51a of which, developed as a skid, rests against the cam surfaces 25 and 26 of the cam disk 24 in the viewing position of the mirror. The application pressure is produced by a spring 53 acting at the lever point 52. The curvature of the curve is so selected that with the lever arm 51a swung into the range of displacement of the cam disk 24, the cam surfaces 25 and 26 (preferably in the form of rollers) can slide or roll along the inner side of the skid when the cam disk 24 rotates, and gradually swing the lever arm 51a out of the range of displacement of the cam surfaces.

The lever arm 51a of the skid lever 51 is linear. Upon the swinging of the lever, the cocking pawl 49 swings along the end side thereof without leaving it. By the sliding of the cocking pawl from the upper edge of the end side of the lever arm 51b to the lower edge, the wire spring 48, when it is held fast by the mirror 1, is cocked in mirror-moving direction. The upper edge of the end side of the lever arm 51b forms a rear stop for the mirror 1.

The operation of the arrangement described above is as follows:

When the camera is ready to take a picture, the mirror 1 is in viewing position and is held in the this position by the angle member 44 of the locking lever 42. Similarly, the auxiliary shutter 10 is closed. The projection 20a of the stop member 20 rests against the projection 17b of the doublearmed lever 17 and thereby locks the auxiliary-shutter mechanism in the closed position of the cover plate 10. The pin 36 of the pawl 28 rests against the projection 38b of the angle or crank lever 38, whereby the connection of cam disk 24 and gear 29 which has been effected via the pawl 28 is interrupted. The drive springs 9 and 19 are cocked and the electric motor is disconnected. All parts of the mechanism assume the position shown in FIG. 6.

Upon the actuation of the camera release button or trigger, the electromagnet 46 is energized and attracts the armature 45. In this way the armature lever 41 is swung and it in its turn via the stop 41b swings the locking lever 42 in clockwise direction so that the angle member 44 releases the mirror 1. At the same time, the angle lever 38 is swung in counterclockwise direction by the fork guide 41a and the pin 38c so that the projection 38b of the lever slides away from under the pin 36 of the pawl 28 and the pawl drops into the teeth 29a of the gear 29 under the force of the spring 39. In this way the connection is again made between the cam disk 24 and the gear 29. With the fallng into position of the pawl 28, the pawl releases the contact arm 54 of the contact 55 so that the contact opens and interrupts the energizing circuit of the electromagnet 46.

The released mirror 1 now swings under the action of the cocked spring 9 out of the viewing position into the picturetaking position. In this connection the spring 9 pulls on the mirror swivel lever 7 which, via the connecting rod 6, moves the carrier lever 3 upward. In the end position, the lower pivot point 6a of the connecting rod 6 reaches the stop member 20 and turns the latter in clockwise direction in opposition to the force of the spring 22. In this way the interlock of the double lever 17 is opened and the double lever, under the influence of the drive spring 19, moves in counterclockwise direction. The movement of the double-armed lever 17 transmitted via the connecting rod 16 to the driver 13 causes the surface 13a of the driver to be pressed against the edge 14a of the extension 14 seated on the cover plate 10, and upon the further movement of the double-armed lever 17, swings the cover plate 10 upward, i.e., into picture-taking position.

The actual exposure process now takes place. With the closing of the shutter after the picture has been taken, the electric motor 34 is connected. Through the intermediate gears 32 and 31, the motor drives the gear 30 connected with the gear 29 in a clockwise direction. The rotation of the gear 30 is transmitted through the tooth-pawl lock 29a, 28 to the cam disk 24. By the rotation of the cam disk 24, the roller 25 is pressed against the free arm of the double-armed lever 17, the latter being thus swung in clockwise direction. The double-armed lever 17 via the connecting rod 16 pulls the driver 13 downward. The driver 13 turns and via the spiral spring 15 swings the cover plate 10 into its viewer position, shown in FIG. 6. During the further course of the rotation of the cam disk 54, the cam projection 25 reaches the arm 7a of the mirror-displacing lever 17 and swings it in counterclockwise direction. In this way the lever 7 is also swung in clockwise direction and via the connecting rod 6 pulls the carrier lever 3 downward and thus pulls the mirror 1 into its viewing position. The mirror 1, with the swinging of the locking lever 42, slides over the angle member 44 and is topped by the latter by the springing back of the locking lever. The purpose of the roller 26 is to hold the double-armed lever 17 until the lower pivot point 6a of the connecting rod again releases the stop member 20 so that the lever 17 can again be locked in the position thereof shown in FIG. 6.

The cam disk 24 turns until the pin 36 of the pawl 28 runs on to the run-on incline 38a of the swivel lever 38. In this way the form-locked connection between the pawl 28 and the gear 29 is eliminated and the gear 29 turns freely. The cam disk 24 is still connected by a slip clutch 56 with the gear 29, whereby it is made possible for the pin 36 of the pawl 28 to travel on to the extension 38b of the swivel lever 38 and come to rest against the stop 37.

The electric motor continues to operate until the transport of the film which has started already with the connecting of the motor is at an end via the take-up wheel 35 and is then stopped in the manner described above in connection with FIGS. 1–5.

In order to increase the speed of the mirror upon the swinging up thereof, there is also provided an aid in starting which greatly accelerates the mirror in the initial phase of its movement. With the swinging of the locking lever 42 and the release of the mirror 1, the leaf spring 48 which is in cocked condition can relax and thereby accelerates the mirror 1. With the movements of the cam disk 24 upon the return of the gearing, the cam projections 25 and 26 move upward in clockwise direction and release the lever arm 51a of the skid lever 51 which rests against them so that said lever, under the action of the spring 53, can swing into the path of displacement of the cam surface 25. The swinging of the skid lever 51 permits the cocking pawl to rotate in clockwise direction so that the returning mirror which then strikes against the leaf spring 48 does not have to cock the latter against its spring force. After the mirror 1 has been locked by the angle member 44 (the leaf spring 48 being still without tension) the cam surface 25 moves onto the inner curve of the lever 51a of the skid lever 51. This lever arm is now swung in clockwise direction, as a result of which the cocking pawl 49 slides along on the end side of the other lever arm 51b of the skid lever and swings in counterclockwise direction. As a result of this swinging, the leaf spring 48 which is connected with it and which in its turn is held fast on the stopped mirror is cocked.

Figure 8:
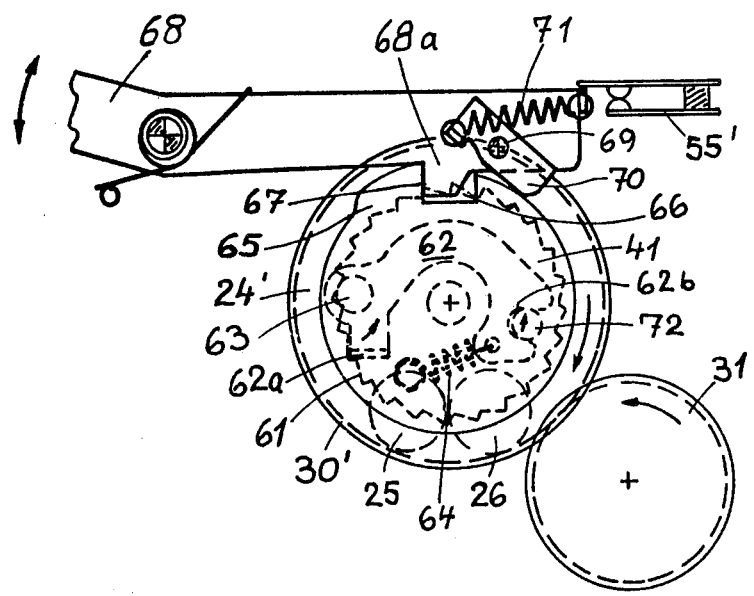
FIG. 8 is a view similar to a portion of FIGS. 6 and 7, illustrating a modified form of the return driving member.

FIG. 8, a modification of the interlock between the cam disk 24 and the gear 30 driving it is shown. The gear 30' bears, in addition to its external teeth which mesh with the teeth of the intermediate gear 31, an internal set of teeth 61 into which a tooth 62a of a pawl 62 can engage. The pawl is supported for swinging around a pivot 63 on the cam disk 24' and is held in engagement by a spring 64 with the internal teeth 61 of the gear 30'. The pawl 62 has a recess 62b into which there engages a pin 72 of a locking disk 65 seated on the same axis as the cam disk. The locking disk bears on its periphery a groove 66 and a locking projection 67. The projection 68a of a lever 68 which takes the place of the angle lever 38 in FIG. 6 can drop into the groove 66 in the unenergized condition of the magnet 46. On the lever 68 there is arranged a pawl lever 70 which is turnable about a fixed pivot 69. A spring 71 fastened to the lever 68 acts against one arm of the pawl 70. The lever 68 acts directly on the contact arm 54 of the contact 55 and effects the switching thereof.

The manner of operation of the arrangement shown in FIG. 8 is as follows:

Upon actuation of the camera release button and the swinging of the armature lever 41 effected thereby, the lever 68 is swung in counterclockwise direction via the armature lever 41. The projection 68a of said lever comes out of engagement with the groove 66 of the locking disk 65. At the same time, the cocking pawl 70 is straightened under the action of the spring 71 and prevents the lever 68 falling back at the moment when the lever 68 opens the contact 55' and the electromagnet 46 thus becomes without current.

The connected electric motor 34 turns the gear 30' via the intermediate gears 32 and 31'. By the engagement of the tooth 62a of the pawl 62 into the internal teeth 61 of the gear 30', the cam disk 24' is turned in clockwise direction, while via the recess 62b of the pawl 62 and the pin 72, the locking disk 65 is turned in clockwise direction. The cam surfaces 25', 26' present on the cam disk have the function already described in connection with the description of FIG. 6. Immediately after the starting of the gear 30', the pawl lever 70 is swung by the locking projection 67 in opposition to the spring force 71 and during the entire rotation of the gear 30 rests on the periphery of the locking disk 65. In this way the lever 68 can again fall back and its projection 68a also slides over the periphery of the locking disk 65. After precisely one revolution of the gear 30' or the cam disk 24' and the locking disk 65, the projection 68a of the lever 68 can drop into the groove 66 of the locking disk 65. In this way the locking disk 65 is held fast, while gear and cam disk try to turn further. The pin 72 which is stationary with the locking disk 65 now causes the locking pawl 62 to swing around the fixed point 63 in counterclockwise direction. In this way the tooth 62a comes out of engagement with the internal teeth 61 of the gear 30', as a result of which the form-locked connection between cam disk 24' and gear 30' is eliminated and the cam disk 24' comes to a stop while the gear 30' continues to rotate. In the case of this arrangement, it should be seen to it that the pawl 62 is so arranged on the cam disk 24' that the tooth 62a can freely turn out and therefore that no undercut on the locking tooth impedes the sliding out and the line of force of the tangential force transmission extends outward past the pawl fulcrum.

A single lens mirror reflex camera as herein disclosed is very fast in operation, with a substantial saving of time of operation, as compared with prior cameras. This is due in part to the very fast yet smooth action of the mirror in swinging from viewing position to picture-taking position, as well as the fast action of speeding up the subsequent steps, including the above-mentioned feature that the step-by-step control switch can move on to its next step to initiate further functions, while the mirror returning and film winding operations are still in progress. This saving in time according to the present invention can amount to a total (including the saving on account of the quick swinging of the mirror plus the saving on account of the way the step-by-step switch can move on to the next step) of about 300 milliseconds out of a total operating time of about 900 milliseconds.

What is claimed is:

1. A photographic camera having a plurality of functions to be performed during one complete cycle of operations to take one photograph, a step-by-step switch advancing through successive steps to initiate performance of said functions, an electric motor for performing at least one of said functions, means operated by said step-by-step switch for closing a circuit to said motor to start the running of the motor when said switch reaches a predetermined one of its steps, means responsive to the running of said motor for keeping said circuit closed independently of said step-by-step switch so that said motor may continue to run for an interval after said step-by-step switch has advanced to a subsequent step and is no longer effective to close said circuit, and means also responsive to the running of said motor for opening said circuit to stop the running of said motor when said motor has run for an interval sufficient to accomplish its function.

2. A photographic camera comprising a film exposure gate, means for holding a supply of film in position to have successive portions thereof wound into and beyond said gate, and electric motor for winding said film, and electric circuit effective while closed to cause said motor to run, starting means for temporarily closing said circuit to start the running of said motor and thereby start the winding of said film, means responsive to the winding of said film for keeping said circuit closed independently of said starting means and for thereafter opening said circuit until it is again closed by said starting means, said means for keeping said circuit closed and thereafter opening said circuit comprising means forming a path which is electrically conductive at intervals and non-conductive at other intervals, and at least one resilient wiper contact engaging said path and forming part of said circuit, and means responsive to the winding of said film for causing relative displacement of said wiper contact and said path, certain electrically conductive intervals of said path each being of a length to keep said circuit closed and said motor running only to the extent required to advance film through the length of one picture exposure area, said wiper contact thereby being placed in a position out of engagement with the conductive interval with which it was previously engaged and in engagement with a next succeeding non-conducting interval to open said circuit and stop the running of said motor, said certain conductive intervals being of a number not less than the number of picture exposure areas on the film.

3. A single lens mirror reflex camera as defined in claim 2, comprising means forming a fixed mirror axis, means forming a lever axis, means forming a first pivot, means forming a second pivot, a swingable mirror pivoted to swing on said fixed mirror axis from a viewing position to a picture taking position and vice versa, an operating lever mounted to swing on a said lever axis, link means operatively articulated to said mirror at a said first pivot and operatively articulated to said operating lever at a said second pivot, and drive means exerting a driving force on said operating lever to tend to swing said mirror to said picture taking position when it is displaced therefrom, the parts being so arranged that when said mirror is in its picture taking position, said lever axis and said first and second pivots all lie in a straight line and the direction of the driving force exerted by said drive means is on a line passing through said lever axis.

4. A camera as defined in claim 3, further including a film winding member, and a motor for concomitantly operating said film winding member and swinging said mirror from its picture taking position to its viewing position against the force of said drive means.

5. A camera as defined in claim 4, further comprising means driven by said motor for engaging said lever to move said lever from its straight line position to an angular position in which said second pivot is materially out of a straight line from said lever axis to said first pivot.

6. A camera as defined in claim 3, wherein said operating lever has two extending in opposite directions from said lever axis, said link means being articulated to one of said arms, said drive means being in the form of a tension spring pulling on the other of said arms.

7. A camera as defined in claim 6, wherein said operating lever has a third arm at an angle to said two arms, and further including means driven by said motor for engaging said third arm of said operating lever to move said lever from its straight line position to an angular position, to swing said mirror from its picture taking position to its viewing position.

8. A camera as defined in claim 3, further including a carrier lever (3) mounted to swing on said mirror axis, said link means (6) being articulated to said carrier lever, an adjustable abutment (4) on said carrier lever for determining the position of said mirror relative to said carrier lever, and spring means (5) tending to keep said mirror in a predetermined position relative to said adjustable abutment.

9. A camera as defined in claim 3, further comprising an additional drive member (48) acting only at the beginning of a swinging movement of said mirror from viewing position toward picture taking position, to accelerate such swinging movement.

10. A camera as defined in claim 3, further comprising means for holding filing an auxiliary shutter for protecting film in the camera against fogging while said mirror is in viewing position, second drive means tending to move said auxiliary shutter from a viewing position toward a picture taking position, a latch for latching said second drive means in viewing position, and means operated upon movement of said mirror from viewing position to picture taking position for releasing said latch so that said second drive means may then move said auxiliary shutter from its viewing position to its picture taking position.

11. A camera as defined in claim 10, further comprising means operated by said motor for concomitantly returning said mirror from its picture taking position to its viewing position against the force of the drive means of the mirror and returning said auxiliary shutter from its picture taking position to its viewing position against the force of said second drive means.

12. A camera as defined in claim 10, wherein said auxiliary shutter comprises a cover plate (10) mounted for swinging movement on a fixed pivot (12), and wherein said second drive means comprises a driver (13) also mounted on said fixed pivot for swinging said cover plate thereon, a double-armed lever (17) turnable on a axis (18), a link (16) having two pivot connections to said double-armed lever and said driver, respectively, and a spring (19) tending to turn said double-armed lever to a position wherein said axis (18) and said pivot connections of said link are all in a straight line, said cover plate being in its picture taking position when said straight line condition exists, said axis and said pivot connections being materially out of a straight line condition when said cover plate is in its viewing position.

13. A camera as defined in claim 12, wherein said latch means comprises a latch (20) engaging said double-armed lever (17) to prevent said double-armed lever from moving toward its straight line condition, and wherein said latch is shifted to release said double-armed lever by movement of said drive means of said mirror.

14. A camera as defined in claim 2, wherein said certain conductive intervals are of a number corresponding to the maximum number of picture exposure areas on the longest film for which the camera is adapted, said camera further including switch means operable to reduce the effective number of said conductive intervals when the camera is to be used with a film having a smaller number of picture exposure areas.

15. A camera as defined in claim 2, wherein said path includes relatively long conductive sections in front of and behind said certain conductive intervals, to keep said circuit closed and said motor running during the time required to wind an advance leader strip of the film before making picture exposures and to wind a trailing strip of the film after making the last picture exposure.

16. A camera as defined in claim 2, further including a rotary member (122 or 134) engaging the film and turned by feeding movement of the film, and means operated by rotation of said rotary member for causing said relative displacement of said path (120 or 138) and said wiper contact (119a, 119b, or 137a, 137b, 137c).

17. A camera as defined in claim 2, wherein said camera is a single lens mirror reflex camera, further comprising a swingable mirror, spring means for swinging said mirror in a first direction, and means operatively connecting said motor to said mirror to swing said mirror in a second direction and simultaneously to tension said spring means ready for subsequent swinging of said mirror in said first direction, concomitantly with said winding of said film.

* * * * *